(12) United States Patent
Visca

(10) Patent No.: US 6,818,688 B2
(45) Date of Patent: Nov. 16, 2004

(54) USE OF (PER)FLUOROPOLYETHER DERIVATIVES IN THE TREATMENT OF SUBSTRATA HAVING A LOW SURFACE ENERGY

(75) Inventor: Mario Visca, Alessandria (IT)

(73) Assignee: Ausimont S.p.A., Milan (IT)

( * ) Notice: Subject to any disclaimer, the term of this patent is extended or adjusted under 35 U.S.C. 154(b) by 333 days.

(21) Appl. No.: 09/848,404

(22) Filed: May 4, 2001

(65) Prior Publication Data
US 2001/0051678 A1 Dec. 13, 2001

(30) Foreign Application Priority Data
May 10, 2000 (IT) .................................. MI2000A1024

(51) Int. Cl.$^7$ ............................................. C08K 5/32
(52) U.S. Cl. .................................................. 524/263
(58) Field of Search ........................................ 524/263

(56) References Cited

U.S. PATENT DOCUMENTS

| | | |
|---|---|---|
| 3,810,874 A | 5/1974 | Mitsch et al. |
| 3,847,978 A | 11/1974 | Sianesi et al. |
| 4,080,743 A | 3/1978 | Manos |
| 4,094,911 A | 6/1978 | Mitsch et al. |
| 4,818,619 A | 4/1989 | Strepparola et al. |
| 5,288,889 A | 2/1994 | Takago et al. |
| 5,446,205 A | 8/1995 | Marchionni et al. |
| 5,714,637 A | 2/1998 | Marchionni et al. |

FOREIGN PATENT DOCUMENTS

| | | |
|---|---|---|
| EP | 0 374 740 A2 | 6/1990 |
| EP | 0 433 070 A2 | 6/1991 |

OTHER PUBLICATIONS

Patent Abstracts of Japan, vol. 1999, No. 05, May 31, 1999 & JP 11 029585 A.

*Primary Examiner*—Peter D. Mulcahy
(74) *Attorney, Agent, or Firm*—Arent Fox PLLC

(57) ABSTRACT

Use for improving the hydro- and oil-repellence properties of substrata having a low surface energy of (per)fluoropolyether mono- and bifunctional derivatives having the structures:

$$W-L-YFC-O-R_f-CFY-L-W \qquad (I)$$

$$R_f-CFY-L-W \qquad (II)$$

wherein:

L is a linking organic group —CO—NR'—$(CH_2)_q$—, with R'=H or $C_1$–$C_4$ alkyl; q is comprised between 1 and 8; Y=F, $CF_3$; W is a —$Si(R_1)_\alpha(OR_2)_{3-\alpha}$ group with $\alpha$=0,1,2, $R_1$ and $R_2$ equal to or different from each other are $C_1$–$C_6$ alkyl groups, $C_6$–$C_{10}$ aryl groups, $C_7$–$C_{12}$ alkyl-aryls or aryl-alkyls;

$R_f$ has a number average molecular weight in the range 200–5,000 and comprises repeating units having at least one of the following structures:

$$(CFXO), (CF_2CF_2O), (CF(CF_3)CF_2O), (CF_2CF(CF_3)O),$$

wherein X=F, $CF_3$.

14 Claims, No Drawings

USE OF (PER)FLUOROPOLYETHER DERIVATIVES IN THE TREATMENT OF SUBSTRATA HAVING A LOW SURFACE ENERGY

The present invention relates to the use or specific (per)fluoropolyether compounds for improving the surface hydro- and oil-repellence properties of substrata having a low surface energy, i.e. substrata which are per se wettable with difficulty both by water and by hydrocarbons and which are desired to be still less wettable. This lower wettability can for example be usefully utilized to increase the resistance to penetration of liquids (for example water or hydrocarbons) in membranes or in porous septa formed by substrata having a low surface energy, such as for example fluoropolymers, in particular polytetrafluoroethylene (PTFE).

With substrata having a low surface energy, all the surfaces with critical wetting tension lower then 40 mN/meter generally are meant; in particular fluorinated polymers, for example PTFE, belong to this class.

It is known in the prior art that materials having a low surface energy are used in the preparation of porous and non porous membranes, used for example to separate gaseous mixtures or for the filtration of liquids/gases. For these uses an improved resistance of the membranes to wettability and to penetration of liquids, both of aqueous and hydrocarbon type, is required. It is known the treatment of surfaces by (per)fluoropolyethers having non reactive end groups, in particular of perfluoroalkyl type. Said treatment leads to a lower wettability, however it shows the drawback of an insufficient permanence of the treatment effects, due to the easy migration and/or removal of the treating agent.

The Applicant has surprisingly and unexpectedly found that this technical problem can be solved by using particular (per)fluoropolyethers as defined hereinafter.

An object of the present invention is the use for improving the surface hydro- and oil-repellence properties of substrata with a low surface energy having a critical wetting tension lower then 40 mN/meter, of (per)fluoropolyether mono- and bifunctional derivatives having the following structures:

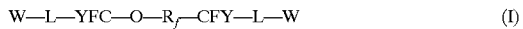   (I)

   (II)

wherein:

L is a linking organic group —CO—NR'—$(CH_2)_q$—, with R'=H or $C_1$–$C_4$ alkyl; q is an integer comprised between 1 and 8, preferably 1–3;

Y=F, $CF_3$;

W is a —$Si(R_1)_\alpha(OR_2)_{3-\alpha}$ group with α=0,1,2, preferably α=0,1;

$R_1$ and $R_2$ equal to or different from each other are $C_1$–$C_6$ alkyl groups, optionally containing one or more ehter O, $C_6$–$C_{10}$ aryl groups, $C_7$–$C_{12}$ alkyl-aryls or aryl-alkyls;

$R_f$ has a number average molecular weight in the range 200–5,000, preferably 300–2,000 and it comprises repeating units having at least one of the following structures, statistically placed along the chain:

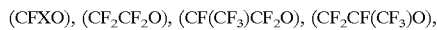

wherein

X=F, $CF_3$;

In particular Rf can have one of the following structures:

1) —$(CF_2O)_a$— —$(CF_2CF_2O)_{b'}$— with a'/b' comprised between 0.5 and 2, extremes included, a' and b' being integers such to give the above mentioned molecular weight;

2) —$(C_3F_6O)_r$—$(C_2F_4O)_b$—$(CFXO)_t$— with r/b= 0.5–2.0; (r+b)/t is in the range 10–30, b, r and t being integers such as to give the above mentioned molecular weight, X has the above indicated meaning;

3) —$(C_3F_6O)_{r'}$—$(CFXO)_{t'}$— t' can be 0; when t' is different from 0 then r'/t'=10–30, r' and t' being integers such to give the above mentioned molecular weight; X has the above indicated meaning;

In the above mentioned formulas:

—$(C_3F_6O)$— can represent units of formula

—$(CF(CF_3)CF_2O)$— and/or —$(CF_2$—$CF(CF_3)O)$—

In structure (II) wherein Rf is monofunctional, the other end group is of T—O— type, wherein T is a (per)fluoroalkyl group selected from: —$CF_3$, —$C_2F_5$, —$C_3F_7$, —$CF_2Cl$, —$C_2F_4Cl$, —$C_3F_6Cl$; optionally one or two F atoms, preferably one, can be replaced by H.

Also mixtures of the above mentioned compounds (I) and (II) can be used. Ratios by weight between the compounds (I) and (II) in the range 100:0 and 5:95 can generally be used.

As (per)fluoropolyether compounds of structure (I) and (II), those wherein $R_f$ has structure (3) are preferably used in the present invention. It has been unexpectedly found that improved hydro- and oil-repellence values are obtained when the compounds of formula (I) with $R_f$ having structure (3) are used. Mixtures of these preferred compounds (I) and (II) with $R_f$ of structure (3) can be used.

As said, with substrata having a low surface energy, all the surfaces having a critical wetting tension lower than 40 mN/meter are generally meant. In particular fluorinated polymers, for example PTFE belong to this class. Other examples of substrata having a low surface energy are polyolefins, for example polyethylyne, polypropylene, polyolefine elastomers, thermoplastic copolymers of tetrafluoroethylene, thermoplastic homopolymers and copolymers of vinylidenfluoride or of chlorotrifluoroethylene, etc.

The bifunctional fluoropolyethers of formula (I) are obtainable by well known processes in the prior art, see for example the following patents herein incorporated by reference: U.S. Pat. No. 3,847,978 and EP 374,740 for the preparation of compounds having acid end groups of —COF type. The silane end group of formula (I) can be obtained by transformation of the —COF into ester —COOR wherein R=alkyl, preferably $C_1$–$C_{12}$, and subsequent ester reaction according to the processes for example mentioned in U.S. Pat. No. 3,810,874. In particular, see U.S. Pat. Nos. 5,714, 637, 4,094,911, 4,818,619. To increase the content of bifunctional acid compounds the keto-acid described in U.S. Pat. No. 3,847,978 can be treated with bases obtaining a mixture of carboxylic acids and polyethers having —$CF_2H$ end groups. When the pure bifunctional derivative of formula (I) is desired to be obtained, further purification steps, for example distillation or chromatography can be carried out.

The monofunctional compounds of formula (II) are obtainable according to the methods mentioned in EP 374, 740, and subsequent transformation of the —COF groups into silane end groups according to the same methods above mentioned for the bifunctional compounds of formula (I).

The (per)fluoropolyethers of the invention can be easily applied on the surface substrata by brushing, spraying, padding, using formulations comprising water and/or solvents having a low environmental impact.

The (per)fluoropolyether derivatives of the invention can be formulated in formulations comprising solvents or water/solvent mixtures. Preferably polar solvents, or mixtures thereof, suitable to the purpose can be selected from the following classes: aliphatic alcohols having from 1 to 6 carbon atoms; aliphatic glycols having from 2 to 8 carbon atoms, optionally having an esterified hydroxyl; ketones or esters having from 3 to 10 carbon atoms, etc. Solvent/water mixtures, such as for example ketone/water or alcohol/water mixtures in ratios by volume between 10:90 and 90:10 can also be used.

In the above mentioned formulations the concentration of the (per)fluoropolyethers of formula (I) and (II) is generally in the range 0.1–30% by weight with an amount of (per)fluoropolyether compound applied to the substratum surface in the range 0.1–20 g/m$^2$, depending on the porosity of the treated material.

To obtain the best results, it is preferable that the polar solvent is combined with a small amount of water, generally between 100 ppm and 10% by weight, optionally in the presence of a silanization catalyst. Alternatively, a thermal treatment cycle can be used in order to favour the crosslinking of the applied compound of structure (I) or (II).

To facilitate the removal of the solvent present in the porosities after the application of the formulations comprising the invention compounds of structure (I) and (II), an additional thermal treatment of the treated surface can follow at a temperature in the range 60–150° C.

The present invention will be better illustrated by the following Examples, which have a merely indicative but not limitative purpose of the scope of the invention itself.

EXAMPLES

Characterization
Measurement of the Contact Angle

The contact angle measurements have been carried out on sintered PTFE plates having size of 1 cm×1.5 cm and thickness of 1.1 mm. The force for unit of length acting on the plate depending on the dipping depth has been determined.

The measurements have been carried out at the temperature of 25° C. and at a dipping rate equal to 6 mm/min in a device for the measurement of the dynamic contact angle. The contact angle has been determined from the average slope of the straight line corresponding to the specimen dipping (advancing contact angle θ).

The measurements have been carried out in water for evaluating the hydro-repellence and in n-hexadecane for evaluating the oil-repellence. The contact angle is reported as an average value of the values obtained in 4 consecutive wetting cycles.

Example 1 (Comparative)

As a substratum having a low surface energy a PTFE plate having the above mentioned sizes has been used. Said plate has not been subjected to any treatment directed to confer hydro- and oil-repellence properties.

The dynamic contact angle has been measured according to the above described method by dipping the plate in water and in a hydrocarbon oil (n-hexadecane). The contact angle measurements are reported in Table 1 for water and in Table 2 for n-hexadecane.

Example 2

A monofunctional perfluoropolyether (PFPE) silane having the structure reported hereunder has been used:

wherein p=2–5.

The above perfluoropolyether compound is formulated at the concentration of 0.1% by weight in a solution comprising 95 parts by weight of isopropanol, 4 parts by weight of water, and 1 part by weight of acetic acid as silanization catalyst. The formulation is applied by dipping on the PTFE plate having the above sizes. After drying/crosslinking in stove at 100° C. for 1 hour, the dynamic contact angle is measured. The results are reported in Table 1 for water.

A formulation comprising the same amounts of water, isopropanol and acetic acid, but having a concentration of perfluoropolyether compound equal to 1% by weight has been used for the dynamic contact angle θ measurement with n-hexadecane. The results are reported in Table 2.

Example 3

A bifunctional perfluoropolyether (PFPE) silane having the structure reported hereunder is used:

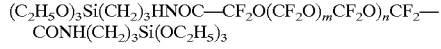

wherein n=2–4, m=3–8.

With this compound the formulations are prepared with the same concentrations of Example 2 and they are applied on the same PTFE substratum of Example 1. The contact angle measurements are reported in Table 1 for water and in Table 2 for n-hexadecane.

Example 4

A formulation is prepared comprising the same amounts of water, isopropanol and acetic acid of Example 2, with a concentration equal to 1% by weight of a mixture of the perfluoropolyether compounds used in Example 2 and in Example 3 in a ratio by weight 80/20 respectively. The mixture is applied on the same PTFE substratum of the previous Examples. The results referring to the contact angle with n-hexadecane are reported in Table 2.

Example 5

Two formulations containing the same amounts of water, isopropanol and acetic acid of Example 2, having a concentration of 0.1% and 1% by weight respectively of a mixture of the following perfluoropolyether compounds, are prepared:

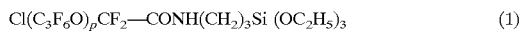 (1)

wherein p=2–5,

 (2)

wherein p=2–4
in a ratio by weight 80/20 respectively.

The mixture is applied on the same PTFE substratum of the previous Examples. The contact angle measurements are reported in Table 1 for water and in Table 2 for n-hexadecane.

From the results of Tables 1 and 2 we can deduce that the treatment with all the perfluoropolyethers of the invention increases the contact angle between the PTFE surface and water as well as the contact angle between the PTFE surface and n-hexadecane. Example 5 confirms the surprisingly improving effect due to the treatment with a mixture formed by bifunctional compounds having structure (I), wherein the fluorinated chain $R_f$ has structure (3), and by a monofunctional compound wherein $R_f$ has the same structure. The effect is still more surprising if one considers that Example 4, where a mixture of a bifunctional compound having $R_f$ of structure (1) with a monofunctional compound having $R_f$ of structure (3) is used, leads to a reduced oil-repellence with respect to the treatment with the only monofunctional compound having $R_f$ of structure (3) described in Example 2.

TABLE 1

| | PFPE concentration (% by weight) | Dynamic contact angle θ |
|---|---|---|
| Example 1 (Comp.) | 0 | 115 |
| Example 2 | 0.1 | 126 |
| Example 3 | 0.1 | 119 |
| Example 4 | — | — |
| Example 5 | 0.1 | 129 |

TABLE 2

| | PFPE concentration (% by weight) | Dynamic contact angle θ |
|---|---|---|
| Example 1 (Comp.) | 0 | 57 |
| Example 2 | 1.0 | 68 |
| Example 3 | 1.0 | 68 |
| Example 4 | 1.0 | 64 |
| Example 5 | 1.0 | 73 |

What is claimed is:

1. Process for improving the hydro- and oil-repellence properties of substrata with a low surface energy having a critical wetting tension lower than 40 mN/meter by applying to said substrata mono- and bi-functional (per) fluoropolyether having the following structures:

  (I)

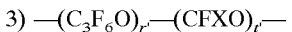  (II)

wherein:
L is a linking organic group —CO—NR'—(CH$_2$)$_q$— with R'=H or C$_1$–C$_4$ alkyl; q is an integer comprised between 1 and 8;
Y=F or CF$_3$;
W is a —Si(R$_1$)$_a$(OR$_2$)$_{3-a}$ group with a=0, 1, 2, R$_1$ and R$_2$ equal to or different from each other are C$_1$–C$_6$ alkyl groups, C$_1$–C$_6$ alkyl groups containing one or more ether 0, C$_6$–C$_{10}$ aryl groups, C$_7$–C$_{12}$ alkyl-aryls or aryl-alkyls;
$R_f$ has a number average molecular weight in the range 200–5,000, and it comprises repeating units having at least one of the following structures, statistically placed along the chain:
(CFXO), (CF$_2$CF$_2$O), (CF(CF3)CF$_2$O), (CF$_2$CF(CF$_3$)O), wherein X=F or CF$_3$.

2. Process according to claim 1, wherein Rf has one of the following structures:

1) 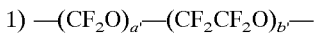

with a'/b' comprised between 0.5 and 2, extremes included, a' and b' being integers such to give the above mentioned molecular weight;

2) 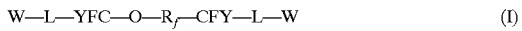

with r/b=0.5–2.0; (r+b)/t is in the range 10–30, b, r and t being integers such as to give the above mentioned molecular weight, X has the above indicated meaning;

3) 

t' can be 0;
when t' is different from 0 then r'/t'=10–30,
r' and t' being integers such as to give the above mentioned molecular weight; X has the above indicated meaning.

3. Process according to claim 1, wherein in structure (II) the other end group is of T—O— type, wherein T is a (per)fluoroalkyl group selected from: —CF$_3$, —C$_2$F$_5$, —C$_3$F$_7$, —CF$_2$Cl, —C$_2$F$_4$Cl, —C$_3$F$_6$Cl; optionally one or two F atoms, prefer one, can be replaced by H.

4. Process according to claim 1, wherein the compounds (I) and (II) are used in mixture.

5. Process according to claim 1, wherein the perfluoropolyether derivatives have formula (I) with $R_f$ having structure (3).

6. Process according to claim 1, wherein the substrata having a low surface energy are selected from the groups consisting of:
polytetrafluoroethylene, polyolefins, polyolefine elastomers, thermoplastic copolymers of tetrafluoroethylene, thermoplastic homopolymers and copolymers of vinylidenfluoride or of chlorotrifluoroethylene.

7. Process according to claim 1, wherein the (per) fluoropolyether derivatives are applied on the substrata by brushing, spraying, padding.

8. Process according to claim 1, wherein the (per) fluoropolyether derivatives are used in formulations comprising solvents or water/solvent mixtures.

9. Process according to claim 8, wherein the solvents are polar and are selected from the following classes:
aliphatic alcohols having from 1 to 6 carbon atoms; aliphatic glycols having from 2 to 8 carbon atoms, aliphatic glycols having an esterified hydroxyl; ketones or esters having from 3 to 10 carbon atoms.

10. Process according to claim 8, wherein as water/solvent mixtures, ketone/water or alcohol/water mixtures in a ratio by volume between 10:90 and 90:10 are used.

11. Process according to claim 8, wherein in the formulations the concentration of the (per)fluoropolyethers of formula (I) and (II) is generally in the range 0.1–30% by weight.

12. Process according to claim 1, wherein the amount of (per)fluoropolyether compound applied on the substratum surface is in the range 0.1–20 g/m$^2$.

13. Process according to claim 1, wherein the polar solvent is combined with water, or with water in the presence of a silanization catalyst.

14. Process according to claim 1, wherein a thermal treatment cycle to favor the crosslinking is used.

* * * * *